United States Patent [19]

Taylor

[11] Patent Number: 4,775,727

[45] Date of Patent: Oct. 4, 1988

[54] RAPID CURE ACRYLIC ADHESIVE COMPOSITIONS

[75] Inventor: Stephen A. Taylor, Glamorgan, Wales

[73] Assignee: BP Chemicals Limited, London, England

[21] Appl. No.: 41,673

[22] Filed: Apr. 23, 1987

[30] Foreign Application Priority Data

Apr. 30, 1986 [GB] United Kingdom ............... 8610526
May 1, 1986 [GB] United Kingdom ............... 8610659

[51] Int. Cl.⁴ ............................................. C08L 75/08
[52] U.S. Cl. .................................... 525/454; 525/455; 525/920
[58] Field of Search .................. 525/454, 920, 455

[56] References Cited

U.S. PATENT DOCUMENTS

| | | | |
|---|---|---|---|
| 4,200,762 | 8/1980 | Schmidle | 525/920 |
| 4,552,932 | 11/1985 | Schollenberger | 525/920 |
| 4,552,964 | 6/1984 | Saracsan | 525/454 |
| 4,694,052 | 9/1987 | Hirose et al. | 525/454 |

FOREIGN PATENT DOCUMENTS

| | | |
|---|---|---|
| 207463 | 2/1984 | Fed. Rep. of Germany ...... 525/454 |
| 2508924 | 1/1983 | France . |
| 2061294 | 5/1981 | United Kingdom . |

*Primary Examiner*—Allan M. Lieberman
*Attorney, Agent, or Firm*—Brooks Haidt Haffner & Delahunty

[57] ABSTRACT

This invention relates to an adhesive composition comprising (a) an acrylic functional urethane elastomer, (b) an acrylic monomer, (c) an organic sulphimide, an organic sulphinate or a salt thereof, (d) a peroxide initiator and (e) a tertiary amine curing accelerator. Component (e) preferably has at least two tertiary nitrogen atoms in its structure and is a reactive organic dye. The adhesive composition is curable aerobically, has faster curing rates than achieved hitherto and shows improved bond-strengths when compared with convetional tertiary amine curing accelerators.

13 Claims, No Drawings

RAPID CURE ACRYLIC ADHESIVE COMPOSITIONS

The present invention relates to improved rapid cure acrylic adhesive compositions.

Acrylic adhesive compositions are well known in the art. These compositions usually contain an acrylic functional urethane elastomer and an acrylic monomer which together form an adhesive resin, a peroxide initiator and a curing agent. Conventional compositions used hitherto have relatively long curing times.

It is an object of the present invention to formulate acrylic adhesive compositions which have a rapid curing rate by the use of novel accelerators.

Accordingly, the present invention is an adhesive composition comprising:

(1) an acrylic functional urethane elastomer,
(2) an acrylic monomer,
(3) one or more organic compounds selected from organic sulphimides, organic sulphinates and salts thereof,
(4) a peroxide initiator and
(5) a curing accelerator characterised in that the curing accelerator is a reactive dye which is (a) capable of being solubilised in the adhesive resin derived by the addition of the acrylic monomer (2) to the urethane elastomer (1) and (b) has at least two tertiary nitrogen atoms linked by one or more conjugated double bonds in its structure.

The acrylic functional urethane elastomer (1) can be prepared by reacting a polyether diol such as e.g. polyoxyethylene glycol or polyoxypropylene glycol with an aromatic diisocyanate to form an isocyanate prepolymer.

In forming the isocyanate prepolymer, the polyether diol used suitably has a molecular weight in the range of 400–2000. The diol is reacted with an aromatic diisocyanate in the presence of a free radical stabilizer such as paramethoxy phenol. The aromatic diisocyanate used may for example be diphenyl methane diisocyanate (also known as "MDI"). Of the total isocyanate groups in the isocyanate prepolymer, it is desirable to have from 2-20%, preferably around 5%, free isocyanate groups.

The isocyanate prepolymer so formed is reacted with a molar excess of an acrylic monomer such as e.g. a hydroxyalkyl (meth)acrylate, specifically hydroxyethyl acrylate, hydroxyethyl methacrylate or hydroxypropyl methacrylate.

It is preferable to use up to 50% molar excess of the acrylic monomer with respect to the free isocyanate groups in the isocyanate prepolymer. This reaction is suitably carried out in the presence of a low molecular weight di(meth)acrylate ester of a glycol e.g. a dimethacrylate of triethylene glycol, tetraethylene glycol, 1,3-butylene glycol or diethylene glycol. This ester preferably has a molecular weight from 600 to 2000. The amount of dimethacrylate ester used is suitably from 10-20 parts per hundred parts of the prepolymer.

The resultant product is the acrylic functional urethane elastomer (1) to which is added the acrylic monomer (2) to form an adhesive resin. Examples of acrylic monomers that may be used include vinyl carboxylic acids and hydroxyalkyl (meth)acrylates. Specifically, these may be selected from hydroxyethyl acrylate, hydroxyethyl methacrylate, hydroxypropyl methacrylate, acrylic acid and methacrylic acid. The amount of acrylic monomer (2) added to the elastomer (1) is suitably from 20–40% by weight of the elastomer.

The organic sulphimides, organic sulphinates and salts thereof (3) used are preferably at least partially soluble in the adhesive resin. The organic sulphimides suitably have a formula:

$$R-SO_2-NHCO-R^1$$

wherein R is an aliphatic, alicyclic or an aromatic group and where $R^1$ is suitably an alicyclic or an aromatic group. Specific examples of such sulphimides include orthobenzene sulphimide. These sulphimides can be used as their salts e.g. sodium salts. The organic sulphinates and their salts suitably have a general formula:

$$R-SO_2-R^2$$

where R has the same significance as for a sulphimide defined above and $R^2$ is either a proton or a monovalent metal ion e.g. ions of the alkali metals. Examples of the organic sulphinates and their salts include sodium benzene sulphinate.

It is preferable to use an equiweight amount of the sulphimide and sulphinate in the resin (e.g. 50/50) at a level of 0.5-2% by weight of the resin.

The peroxide initiator (4) used should be stable at room temperature and is suitably an organic peroxide, preferably an organic hydroperoxide such as e.g. t-butyl peroxide or cumene hydroperoxide. The peroxide initiator is suitably used in an amount from 1-3 parts per hundred parts of the adhesive resins.

The curing accelerator (5) is an organic dye which is (a) capable of being solubilised in the adhesive resin and (b) has at least two tertiary nitrogen atoms linked by conjugated double bonds in its structure.

The dyes are suitably used in the form of their salts e.g. quaternary ammonium halides to enhance solubility.

It is preferable for the dye to contain a high degree of functionality, e.g. the tertiary nitrogen atoms being linked by conjugated double bonds. Specific examples of such organic dyes include Methylene Blue and Crystal Violet. It will be appreciated by those skilled in the art that both these dyes contain at least two tertiary nitrogen atoms, conjugated double bonds linking the two nitrogen atoms, and aromatic ring structures for electron delocalisation.

The organic dyes are suitably used in an amount from 0.1-2 parts per hundred parts of the adhesive resin. The ability of the dyes to cure the resins is particularly enhanced if the curing is initiated photochemically, e.g. in the presence of visible light. Their high reactivity and ability to speed up cure means that use of high levels of the dye may result in uncontrollable cure rates.

In view of the high reactivity between the sulphimides and/or sulphinates (3) and the reactive organic dyes (5), these two components, (3) and (5) should not be allowed to come into contact in the adhesive composition except immediately prior to or at the point of use of the adhesive composition.

Thus it is preferable to store or market the components of this composition as a twin-pack system in any combination but ensuring that the dye (5) and the sulphimide and/or sulphinate (3) are not in the same pack.

For instance, in one pack the adhesive resin (components (1) and (2)) and the organic sulphimide and/or sulphinate (3) may be mixed whereas in the other pack the adhesive resin (components (1) and (2)) may be mixed with the peroxide and the reactive organic dye. In this case, the adhesive is used as a 50:50 mixture by weight of each pack. In use, contents of the two packs are mixed immediately prior to application.

Alternatively, the reactive organic dye may be in a separate pack from the remainder of the components. In this case, it is possible to apply a solution of the organic dye on to the substrate to be bonded. The solution of the dye used is suitably a dilute solution in a volatile solvent such as e.g. 1,1,1-trichloroethane. In this case the dye solution is applied to the substrate to be bonded, the solvent allowed to evaporate leaving a thin coating of the dye behind and then the remaining components of the adhesive are applied onto the dye coated substrate.

The adhesive compositions of the present invention are curable aerobically.

It has been observed that the bond strength of the bonded products resulting from the use of the adhesive composition of the present invention is significantly better than that achieved with adhesives containing the conventional amine curing agents.

The present invention is further illustrated with reference to the following Examples:

The results are shown below in respect of time elapsed before the adhesive acquired adequate handling strength.

EXAMPLE 1

A mixture of diphenyl methane diisocyanate (30.4% w/w), triethylene glycol dimethacrylate (14.3% w/w) and paramethoxy phenol (200 ppm) was intimately mixed with polyxoypropylene glycol (mol wt 425, 35.9% w/w) over 1 hour. To this mixture hydroxyethyl acrylate (19.45 w/w) was added over 10 minutes and the entire mixture heated at 60° C. for 6–8 hours to form the acrylic functional urethane elastomer.

The elastomer so formed was cooled to ambient temperature. Thereafter, hydroxyethyl acrylate (35 phr, based on elastomer) and methacrylic acid (20 phr, based on the elastomer) were added to the elastomer to form the adhesive resin.

The resulting adhesive resin was formulated into a twin pack adhesive composition (50/50 w/w of each pack) containing the following ingredients in each pack and tested in daylight for cure rates.

| Pack 1 | |
|---|---|
| Adhesive resin (as above) | 100 phr |
| o-benzoic sulphimide | 0.5 |
| Sodium benzenesulphinate | 0.5 |
| Cumene hydroperoxide | 3.0 |
| Pack 2 | |
| Adhesive resin (as above) | 100 phr |
| Curing-agent | 0.5 phr |

The following cure times are obtained (for handling strength) using the various curing agents listed below:

| Curing agent | Cure Time (min) |
|---|---|
| N,N—bis-(2-hydroxyethyl)-p-toluidine | 10–20 |
| Methylene Blue | 2–3 |
| Crystal Violet | 2–3 |
| None | no cure even after 4 hours |

The above results show that use of an organic dye such as Methylene Blue and Crystal Violet according to the invention have a far superior cure rate compared with conventional curing agents.

EXAMPLES 2 AND 3

In these Examples and the additional Comparative Tests the adhesive resin, the organic sulphimide/salt and the peroxide used were the same as that in Example 1 above. The tertiary amine curing agents used and the results achieved are tabulated below. The lap shear data given below was determined under standard test conditions as prescribed in British Standard No. BS 5350, Part C-5, 1976.

| Example | Tertiary Amine | Curing Time (min) |
|---|---|---|
| | N,N—bis(2-hydroxyethyl)-p-toluidine* | 10–20 |
| 2 | Methylene Blue | 2–3 |
| 3 | Crystal Violet | 2–3 |

*Comparative Test not according to the invention.

| Bond Strength Tests Tertiary Amine | Surface Treatment | Lap Shear/ Nmm$^{-2}$ |
|---|---|---|
| N,N—bis(2-hydroxyethyl)- p-toluidine* | as received | 5.5 |
| | grit blasted | 9.2–17.6 |
| Methylene blue | as received | 19.5–21.8 |
| | grit blasted | 20.4–23.0 |
| Crystal Violet | as received | 16.2–20.1 |

*Comparative Test not according to the invention.

I claim:

1. An adhesive composition comprising:
   (1) an adhesive resin derived by the addition of (a) an acrylic functional urethane elastomer to; (b) from 20–40% by weight of an acrylic manomer based on the weight of the elastomer;
   (2) from 0.5 to 2% by weight based on the weight of resin of one or more organic compounds selected from the group consisting of organic sulphimides, organic sulphinates and salts thereof;
   (3) from 1 to 3% by weight based on the weight of the resin of a peroxide initiator which is stable at room temperature; and
   (4) from 0.1 to 2% by weight based on the weight of the resin of a curing accelerator characterized in that the curing accelerator is an organic dye which is: (i) capable of being solubilized in the adhesive resin; and (ii) has at least two teritiary nitrogen atoms linked by one or more conjugated double bonds in its structure.

2. An adhesive composition according to claim 1 wherein the elastomer (a) is derivable by reacting (i) a polyether diol with an aromatic diisocyanate to form an isocyanate prepolymer and (ii) reacting the isocyanate prepolymer with a molar excess of an acrylic monomer in the presence of a low molecular weight di(meth)acrylate ester of a glycol.

3. An adhesive composition according to claim 2 wherein the polyether diol is at least one of a polyoxyethylene glycol or a polyoxypropylene glycol and has a molecular weight from 400–2000, the aromatic diisocyanate is diphenyl methane diisocyanate, the isocyanate prepolymer has from 2–20% free isocyanate groups, and up to 50% molar excess of the acrylic monomer based on the free isocyanate groups in the prepolymer is used for reaction with the prepolymer.

4. An adhesive composition according to claim 2 or claim 3 wherein the di(meth)acrylate ester is an ester of a glycol which is at least one of triethylene glycol, tetraethylene glycol, 1,3-butylene glycol or diethylene glycol and the ester is used in an amount from 10–20 parts per hundred parts of the prepolymer.

5. An adhesive composition according to claim 1 wherein the acrylic monomer is at least one of a vinyl carboxylic acid or a hydroxyalkyl(meth)acrylate.

6. An adhesive composition according to claim 1 or 5 wherein the acrylic monomer is at least one of hydroxyethylacrylate, hydroxyethylmethacrylate, hydroxypropyl methacrylate, acrylic acid or methacrylic acid.

7. An adhesive composition according to claim 1 wherein the organic compound (2) is a sulphimide which has the formula R—SO$_2$—NH—COR$^1$ wherein R is an aliphatic, alicyclic or an aromatic group and where R$^1$ is an alicyclic or an aromatic group.

8. A process according to claim 1 wherein the organic sulphinates and their salts suitably have a general formula:

R—SO$_2$—R$^2$ where R has the same significance as for a sulphimide defined in claim 7 and R$^2$ is either a proton or a monovalent metal ion.

9. The process of claim 8 wherein the monovalent metal ion is an alkali metal ion.

10. An adhesive composition according to claim 1 or 7 wherein the organic sulphimide, organic sulphinate or a salt thereof is at least one of an o-benzene sulphimide or a sodium benzene sulphinate.

11. An adhesive composition according to claim 1 wherein the organic sulphimide, organic sulphinate or salt thereof is used in an equiweight amount (50/50 mixture) with respect to the adhesive resin.

12. An adhesive composition according to claim 1 wherein the curing accelerator is at least one of methylene blue or crystal violet.

13. An adhesive composition according to claim 1 or 12 wherein the curing accelerator is used in the form of its quaternary ammonium salt.

* * * * *